April 3, 1951  R. E. KELLOGG ET AL  2,547,326
COUPLING PIN

Filed Aug. 28, 1947  2 Sheets-Sheet 1

INVENTORS
ROBERT E. KELLOGG
EVERETT J. KELLOGG
By Warren H. F. Schmieding
ATTORNEY April 3, 1951  R. E. KELLOGG ET AL  2,547,326
COUPLING PIN
Filed Aug. 28, 1947  2 Sheets-Sheet 2
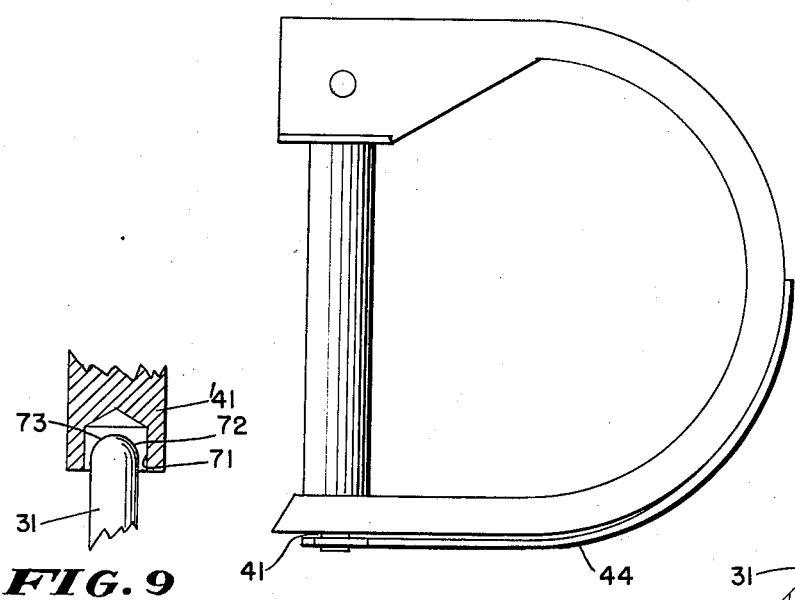
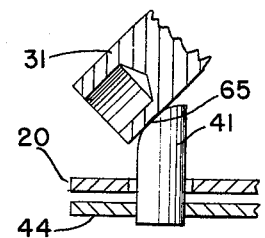
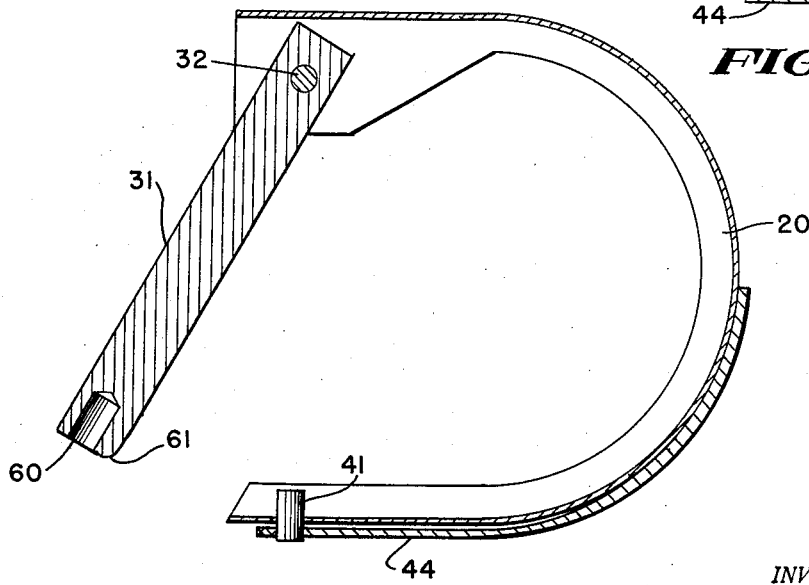
INVENTORS
ROBERT E. KELLOGG
EVERETT J. KELLOGG
BY
Warren H. F. Schmieding
ATTORNEY Patented Apr. 3, 1951

2,547,326

UNITED STATES PATENT OFFICE 2,547,326

COUPLING PIN

Robert E. Kellogg, Nevada, and Everett J. Kellogg, Columbus, Ohio

Application August 28, 1947, Serial No. 771,110

2 Claims. (Cl. 85—5)

This invention relates to coupling pins, and more particularly to a towing attachment for use in trailer hitches, car couplings, hitches between farm implements and in other like and similar capacities.

One of the objects of this invention is to provide a new type of coupling pin having a safety retaining device or lock therefor which is simple and easy to operate and relatively incapable of fouling.

Another object of the invention is to provide an improved coupling structure constructed to automatically lock in the closed position when the coupling rod thereof swings into place.

An additional object is to provide a trailer coupling of the character described having a positive locking action and means to secure and lock the coupling against accidental opening, which can be released only by manual operation of the coupling rod and locking pin which together positively lock the coupling, and which can be applied quickly and easily, as well as detached, when desired with safety.

It is also an object to provide a towing attachment which is ruggedly and compactly constructed with a minimum of parts, which can be manufactured at relatively reduced cost, and which includes a novel latching mechanism insuring a quick, positive and safe closure; a spring pressed pin and locking rod with a camming cooperation therebetween being provided for this purpose.

Further objects and advantages of the present invention will be apparent from the following description, reference being had to the accompanying drawings wherein preferred forms of embodiments of the invention are clearly shown.

In the drawings:

Fig. 6 is a side elevational view of the towing attachment showing a modified construction, the closed position being illustrated;

Fig. 7 is a vertical sectional view of the towing attachment illustrated in Fig. 6, the open or unlocked position being shown;

Fig. 8 is a broken view, partly in elevation and in section, showing a modified form of pin and rod construction; and Fig. 9 is also a broken view, partly in elevation and in section, showing another modified form of pin and rod construction.

Figure 5:
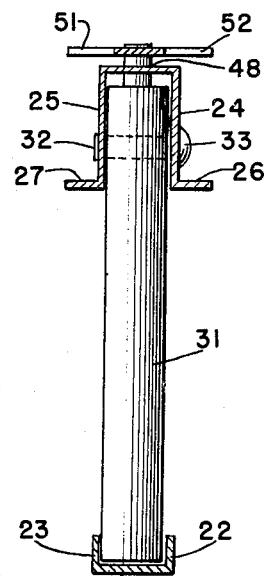
Fig. 5 is a side elevational view, partly in section, taken substantially on the line 5—5 of Fig. 1.

Referring further to the figures, the preferred form of towing attachment illustrated comprises in general a coupling structure having a substantially C-shaped coupling pin retaining frame 20 which is formed from a metal channel strip 21. This channel strip, as seen most clearly in Fig. 5, is formed with a bottom or back piece having short vertically extending side flanges 22 and 23. The upper portion of frame 20 is formed with downwardly extending side pieces or web members 24 and 25 which have their lower edges turned outwardly to form the flange portions 26 and 27. These flange portions provide convenient finger gripping areas for applying a downward pressure when, for example, the coupling is to be opened or removed from coupling engagement.

The coupling pin 31 is pivotally connected at its upper end to the frame 20. A pin 32 which extends through the web members 24 and 25 of frame 20 is provided for this purpose. Pin 32 is secured in position in any convenient and suitable manner; an enlarged button head 33 at one end and a small pressed head at the other being illustrated as one means of holding the rivet or pin in position. Pin 31 is also provided at its upper end with a substantially centrally located bore 40 which extends down into the pin from the upper end surface thereof for a depth sufficient to receive and securely hold the end of pin 41 when the frame is in coupling pin retaining position.

Figure 4:
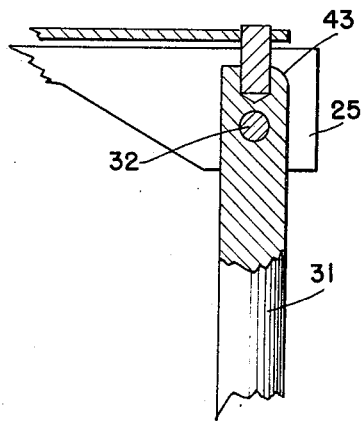
Fig. 4 is a broken elevational view, partly in section, showing the pin and rod in the locked or closed position, as illustrated in Fig. 1.
Figure 3:
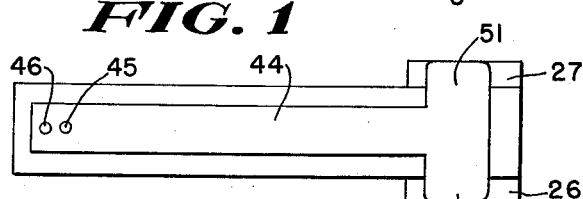
Fig. 3 is a top elevation of the towing attachment shown in Fig. 1.
Figure 2:
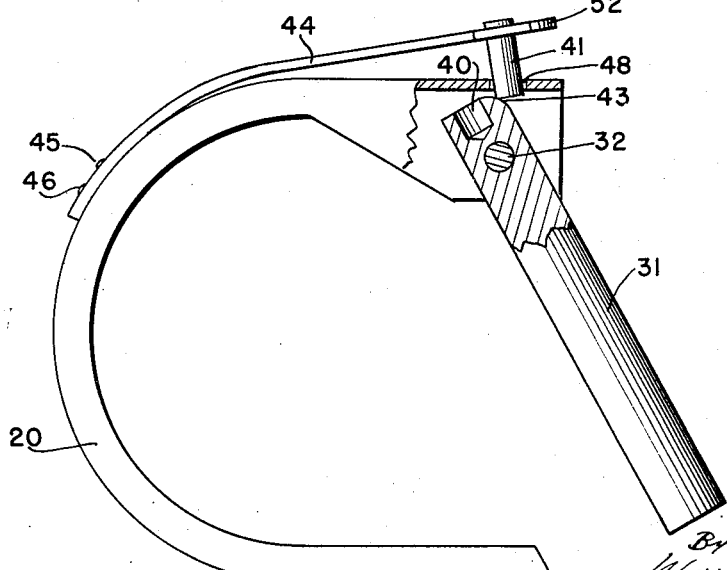
Fig. 2 is a view similar to Fig. 1 showing the open or unlocked position, the upper end of the rod being shown in section to better illustrate the construction.

To facilitate raising pin 41, when it is desired to unlock the coupling and swing rod 31 into the open position, and to facilitate the closing and locking operations, the outer upper corner of pin 31 is beveled as shown in Figs. 2 and 4 to provide a camming surface 43 which is adapted to contact and ride against the end of pin 41. With this construction, and the pin 31 in the open position, for example as illustrated in Fig. 2, only a slight movement thereof is sufficient to cause pin 41 to be raised sufficiently for the frame to snap into the closed and locked position.

Pin 41, which has a diameter slightly less than the overall diameter of bore 40, is formed as an integral part of one end of the spring leaf 44 which in turn is connected at the other end to the upper and outer surface of frame 20. A pair of rivets 45 and 46, which have their heads flush against the inside surface of hook member 20, project through holes formed therein for that purpose. Pin 41 projects downwardly from leaf 44 through an aperture 48 formed in the top of frame 20, so as to be in a position to be received within the bore 40 of rod 31 when the coupling is to be closed and locked.

Spring leaf 44 is also provided at its outer free end with a transversally projecting T-portion having tips 51 and 52 which are formed as an integral part thereof. These tips 51 and 52 thus provide outwardly projecting gripping surfaces which are conveniently grasped by the fingers when it is desired to raise spring 44 and its depending pin 41 from the locking position in bore 40 of pin 31, as when the coupling is to be opened.

Figure 1:
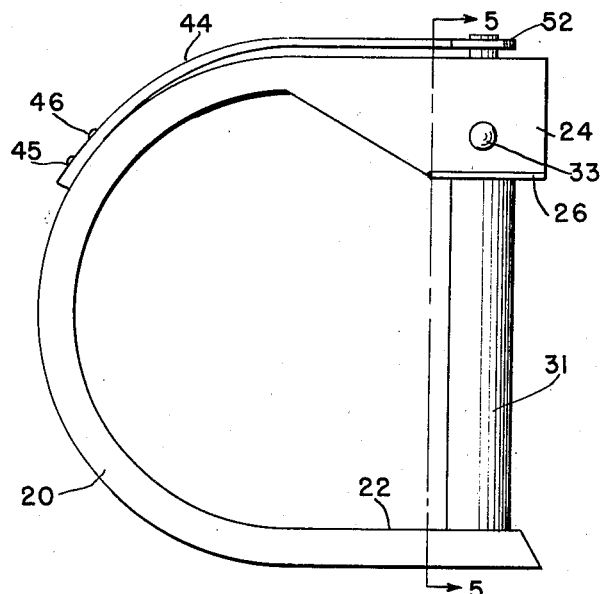
Fig. 1 is a side elevation of a towing attachment constructed to embody one form of the invention and shows the locked or closed position thereof.

Referring to Figs. 6 and 7, a modified form of coupling is shown. In this modification pin 31 is provided with a central bore 60 at its free end, that is, at the end opposite from the one pivotally connected to the frame 20. A beveled or camming surface 61 is also provided on the free end of pin 31, that is, on the opposite end of the pin from which the camming surface 43 is shown and described in connection with Fig. 2. Spring leaf 44, together with pin 41, are in turn connected to the opposite end of frame 20 from the arrangement previously described in connection with Fig. 2. It will be readily apparent from Figs. 6 and 7 that otherwise the operation of the coupling pin shown is similar to that previously described in connection with Figs. 1 and 2.

Further construction modifications with respect to pin 31 and pin 41 are shown in Figs. 8 and 9. As illustrated in Fig. 8, the pin 41 rather than the pin 31 is provided with a beveled camming surface 65, such as previously described and shown at 43 and 61 in Figs. 2 and 7. A further modification is shown in Fig. 9 wherein the lower end of pin 41 is provided with a central bore 71 which is of sufficient diameter to be received over the outside of the end of pin 31 to provide a locking connection therewith. With this construction, if desired, and to facilitate the operation, a pair of camming surfaces are provided on the upper end of rod 31 as shown at 72 and 73.

From the above description it will be apparent that there is provided a ruggedly and compactly constructed towing attachment, having a minimum of parts, which can be manufactured at a relatively reduced cost, and which operates easily and safely under all conditions.

While the forms of embodiments of the present invention as herein disclosed constitute preferred forms, it is to be understood that other forms might be adopted, all coming within the scope of the claims which follow.

We claim:

1. In combination, a coupling pin; a substantially C-shaped retaining frame for retaining the pin in coupling position; pin means extending transversely of the coupling pin for pivotally supporting the coupling pin to a leg of the C-shaped frame; a retaining pin extending through the frame and movable to aligned position with the coupling pin when the frame is moved to closed position, one of said pins having a substantially longitudinal bore therein for receiving the other of said pins; and a leaf spring closely embracing the outer part of the C-shaped frame and having one end secured to the frame, said retaining pin being secured to the other end of the leaf spring, said leaf spring being inherently biased to force the retaining pin inwardly.

2. In combination, a coupling pin; a substantially C-shaped retaining frame for retaining the pin in coupling position; pin means extending transversely of the coupling pin for pivotally supporting the coupling pin to a leg of the C-shaped frame; a retaining pin extending through the frame and movable to aligned position with the coupling pin when the frame is moved to closed position, one of said pins having a substantially longitudinal bore therein for receiving the other of said pins; and a leaf spring closely embracing the outer part of the C-shaped frame and having one end secured to the frame, said retaining pin being secured to the other end of the leaf spring, said leaf spring being inherently biased to force the retaining pin inwardly, one of said pins having an outer camming surface for camming the retaining pin outwardly against the action of the leaf spring when the retaining frame is moved to coupling pin retaining position.

ROBERT E. KELLOGG.
EVERETT J. KELLOGG.

REFERENCES CITED

The following references are of record in the file of this patent:

UNITED STATES PATENTS

| Number | Name | Date |
| --- | --- | --- |
| 115,113 | Shaw | May 23, 1871 |
| 831,260 | Borlang | Sept. 18, 1906 |
| 978,330 | Norman | Dec. 13, 1910 |
| 1,218,926 | Burns | Mar. 13, 1917 |
| 1,467,844 | Damm | Sept. 11, 1923 |
| 1,632,877 | Brcecinski | June 21, 1927 |
| 2,077,825 | Davidson | Apr. 20, 1937 |
| 2,224,522 | Peterson | Dec. 10, 1940 |
| 2,436,210 | Fuhrer et al. | Feb. 17, 1948 |

FOREIGN PATENTS

| Number | Country | Date |
| --- | --- | --- |
| 532,113 | Germany | Aug. 25, 1931 |